(12) United States Patent
Rimmington (10) Patent No.: US 9,758,309 B2
(45) Date of Patent: Sep. 12, 2017

(54) CONTROLLING A CONVEYOR IN A MINING SYSTEM

(71) Applicant: Joy MM Delaware, Inc., Wilmington, DE (US)

(72) Inventor: Gareth Rimmington, Barnsley (GB)

(73) Assignee: Joy MM Delaware, Inc., Wilmington, DE (US)

( * ) Notice: Subject to any disclaimer, the term of this patent is extended or adjusted under 35 U.S.C. 154(b) by 23 days.

(21) Appl. No.: 14/722,118

(22) Filed: May 26, 2015

(65) Prior Publication Data

US 2016/0347552 A1    Dec. 1, 2016

(51) Int. Cl.
| | |
|---|---|
| *B65G 43/00* | (2006.01) |
| *E21F 13/06* | (2006.01) |
| *B65G 23/44* | (2006.01) |

(52) U.S. Cl.
CPC ............. *B65G 43/00* (2013.01); *B65G 23/44* (2013.01); *E21F 13/06* (2013.01)

(58) Field of Classification Search
CPC ........ B65G 23/44; B65G 43/00; B65G 43/02; E21F 13/06
USPC ............................................ 198/810.04, 813
See application file for complete search history.

(56) References Cited

U.S. PATENT DOCUMENTS

| | | | | |
|---|---|---|---|---|
| 3,923,151 | A | * | 12/1975 | Weber .................... B65G 23/00 198/810.04 |
| 4,657,131 | A | | 4/1987 | Brychta et al. |
| 5,131,528 | A | | 7/1992 | Bandy, Jr. |
| 5,647,640 | A | * | 7/1997 | Heintzmann ........... E21C 27/34 198/810.04 |
| 7,117,989 | B2 | | 10/2006 | Weigel et al. |
| 8,061,510 | B2 | | 11/2011 | Tout |
| 8,191,703 | B2 | | 6/2012 | Tokhtuev et al. |
| 8,285,494 | B2 | | 10/2012 | Vozner |
| 8,550,236 | B2 | | 10/2013 | Merten et al. |
| 8,783,446 | B2 | | 7/2014 | Martin |
| 8,789,892 | B2 | | 7/2014 | Niederriter et al. |
| 9,440,797 | B1 | | 9/2016 | Rimmington |

(Continued)

FOREIGN PATENT DOCUMENTS

| | | |
|---|---|---|
| DE | 19537386 A1 | 4/1997 |
| GB | 2346663 A | 8/2000 |

(Continued)

*Primary Examiner* — Gene Crawford
*Assistant Examiner* — Keith R Campbell
(74) *Attorney, Agent, or Firm* — Michael Best & Friedrich LLP (57) ABSTRACT

Systems and methods for controlling a conveyor in a mining system. The conveyor includes a chain, a first sprocket, a second sprocket, a drive mechanism, a first sensor, a second sensor, and a controller. The method includes receiving a first signal associated with a characteristic of at least one of a first sprocket or a second sprocket, determining a value for the characteristic of the at least one of the first sprocket or the second sprocket based on the first signal, receiving a second signal associated with a characteristic of a chain, and determining a value for the characteristic of the chain based on the second signal. The method further includes comparing the value for the characteristic of the at least one of the first sprocket or the second sprocket and the value for the characteristic of the chain and determining the amount of slack in the chain based on the comparison.

24 Claims, 7 Drawing Sheets

(56) References Cited

U.S. PATENT DOCUMENTS

| | | |
|---|---|---|
| 9,440,800 B1 | 9/2016 | Rimmington |
| 2011/0024268 A1 | 2/2011 | Merten et al. |
| 2013/0068594 A1* | 3/2013 | Worthington .......... B65G 23/44 |
| | | 198/810.04 |
| 2014/0203621 A1 | 7/2014 | Saikia |
| 2014/0330430 A1 | 11/2014 | Waller et al. |

FOREIGN PATENT DOCUMENTS

| | | |
|---|---|---|
| GB | 2493102 A | 1/2013 |
| PL | 176187 | 4/1994 |
| WO | 2015086110 A1 | 6/2015 |

* cited by examiner

CONTROLLING A CONVEYOR IN A MINING SYSTEM

BACKGROUND

This invention relates to the control of a conveyor, such as an armored face conveyor ("AFC") or a beam stage loader ("BSL").

SUMMARY

Longwall mining systems include, among other things, a conveyor such as an AFC or BSL to transport a mined material (e.g., coal) from an area where the material is being mined to an area for processing (e.g., crushing, storage, etc.). AFCs include a first sprocket and a second sprocket around which a chain is provided. The chain is driven by one or more motors (e.g., a maingate motor, a tailgate motor, etc.), and the movement of the chain around the sprockets causes a conveyor to transport the mined material. Conventional conveyors that include an extendable return end frame use tensioning techniques to increase chain tension around the sprockets and minimize slack chain or zero tension conditions (e.g., the chain is equally tensioned throughout its length). The tensioning techniques include, for example, using a hydraulic cylinder to push the first sprocket away from the second sprocket. As the conveyor becomes loaded with mined material, the conveyor chain is subjected to stresses and strain which result in an amount of slack in the chain.

Conventional tensioning techniques rely upon direct measurements of chain tension (e.g., using a loadpin) or indirect measurements of chain tension that use, for example, motor power or another characteristic of a drive mechanism to determine an estimated chain tension. Such techniques are unreliable due to sensor damage or inaccuracy, and can also be expensive to implement. As a result, the control of the tension in the chain can also be unreliable and expensive to implement.

This invention relates to improved and simplified techniques for controlling an amount of tension in a chain to limit the slack in the chain. The invention includes systems and methods for determining an amount of slack in a chain of a conveyor or a portion of a conveyor in a mining system. A controller then adjusts (i.e., increases or decreases) a distance between a first sprocket and a second sprocket to adjust chain tension based on the determined amount of slack in the chain. The amount of slack in the chain can be determined based on a comparison of a characteristic of at least one of the first sprocket or the second sprocket and a characteristic of the chain. Additionally or alternatively, the amount of slack in the chain can be determined based on a comparison of a number of chain links passing a first monitored position and a number of chain links passing a second monitored position.

In one embodiment, the invention provides a conveyor for a mining system. The conveyor includes a first sprocket and a second sprocket, a chain associated with the first sprocket and the second sprocket, a drive mechanism coupled to at least one of the first sprocket or the second sprocket, a first sensor, a second sensor, and a controller. The drive mechanism is operable to drive the at least one of the first sprocket or the second sprocket. The first sensor is operable to generate a first signal related to a characteristic of at least one of the first sprocket or the second sprocket. The second sensor is operable to generate a second signal related to a characteristic of the chain. The controller is operable to receive the first signal from the first sensor, determine a value for the characteristic of the at least one of the first sprocket or the second sprocket based on the first signal, receive the second signal from the second sensor, and determine a value for the characteristic of the chain based on the second signal. The controller is also operable to compare the value for the characteristic of the at least one of the first sprocket or the second sprocket and the value for the characteristic of the chain and determine an amount of slack in the chain based on the comparison.

In another embodiment, the invention provides a method of determining an amount of slack in a chain for a conveyor in a mining system. The method includes receiving, at a processor, a first signal associated with a characteristic of at least one of a first sprocket or a second sprocket, determining, using the processor, a value for the characteristic of the at least one of the first sprocket or the second sprocket based on the first signal, receiving, at the processor, a second signal associated with a characteristic of a chain, and determining, using the processor, a value for the characteristic of the chain based on the second signal. The method further includes comparing, using the processor, the value for the characteristic of the at least one of the first sprocket or the second sprocket and the value for the characteristic of the chain and determining, using the processor, an amount of slack in the chain based on the comparison.

In another embodiment, the invention provides a conveyor for a mining system. The conveyor includes a first sprocket and a second sprocket, a chain associated with the first sprocket and the second sprocket, a monitored zone having a first monitored position and a second monitored position, a drive mechanism coupled to at least one of the first sprocket or the second sprocket, a first sensor, a second sensor, and a controller. The drive mechanism is operable to drive the at least one of the first sprocket or the second sprocket. The first sensor is operable to generate a first signal related to a number of chain links passing the first monitored position of the monitored zone. The second sensor is operable to generate a second signal related to a number of chain links passing the second monitored position of the monitored zone. The controller is operable to receive the first signal from the first sensor, determine the number of chain links passing the first monitored position based on the first signal, receive the second signal from the second sensor, and determine the number of chain links passing the second monitored position based on the second signal. The controller is also operable to compare the number of chain links passing the first monitored position and the number of chain links passing the second monitored position and determine an amount of slack in the chain based on the comparison.

In another embodiment, the invention provides a method of determining an amount of slack in a chain for a conveyor in a mining system. The method includes receiving, at a processor, a first signal associated with a characteristic of at least one of a first sprocket or a second sprocket, determining, using the processor, a number of chain links passing a first monitored position based on the first signal, receiving, at the processor, a second signal associated with a characteristic of a chain, and determining, using the processor, a number of chain links passing a second monitored position based on the second signal. The method further includes comparing, using the processor, the number of chain links passing the first monitored position and the number of chain links passing the second monitored position and determining, using the processor, the amount of slack in the chain based on the comparison.

Before any embodiments of the invention are explained in detail, it is to be understood that the invention is not limited in its application to the details of the configuration and arrangement of components set forth in the following description or illustrated in the accompanying drawings. The invention is capable of other embodiments and of being practiced or of being carried out in various ways. Also, it is to be understood that the phraseology and terminology used herein are for the purpose of description and should not be regarded as limiting. The use of "including," "comprising," or "having" and variations thereof herein are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components may be utilized to implement the invention. For example, "servers" and "computing devices" described in the specification can include one or more processing units, one or more computer-readable medium modules, one or more input/output interfaces, and various connections (e.g., a system bus) connecting the components.

Independent aspects of the invention will become apparent by consideration of the detailed description and accompanying drawings.

DETAILED DESCRIPTION

The invention described herein relates to the control of a chain conveyor system. The chain conveyor system includes, for example, armored face conveyors ("AFCs") or beam stage loaders ("BSLs"). For descriptive purposes, the invention is described herein with respect to embodiments that include AFCs. AFCs include a first sprocket, a second sprocket, a chain, one or more drive mechanisms (e.g., motors), one or more hydraulic cylinders, and a controller. The controller is operable to receive one or more signals related to characteristics of the AFC and determine an amount of slack in a chain based on the signals. The characteristic of the AFC is, for example, a characteristic of the first sprocket and/or the second sprocket (e.g., a sprocket rotational position, a sprocket rotational speed, a sprocket rotational acceleration, a number of links passing a location, etc.), a characteristic of the chain (e.g., chain position, a chain speed, a chain acceleration, a number of links passing a location, etc.), etc. The controller is also operable to automatically control the relative positions of the first sprocket and second sprocket based on the determined amount of slack in the chain.

Figure 1:
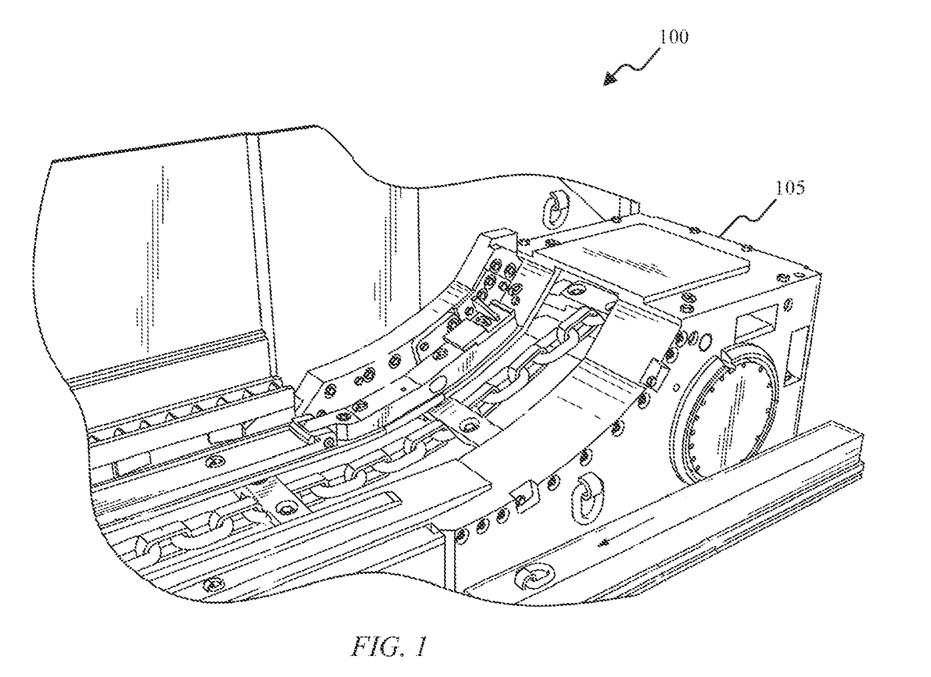
FIG. 1 illustrates a portion of a chain conveyor including an end frame.

FIG. 1 illustrates a portion of an AFC 100 that includes a return end frame 105. The end frame 105 includes, among other things, a fixed frame portion, an extendable frame portion, and one or more hydraulic cylinders. The return end frame 105 is a part of a longwall mining system that also includes, for example, a shearer. The position of the one or more hydraulic cylinders can be modified to correspondingly control the position of the extendable frame portion, the first sprocket, the second sprocket, etc.

Figure 2:
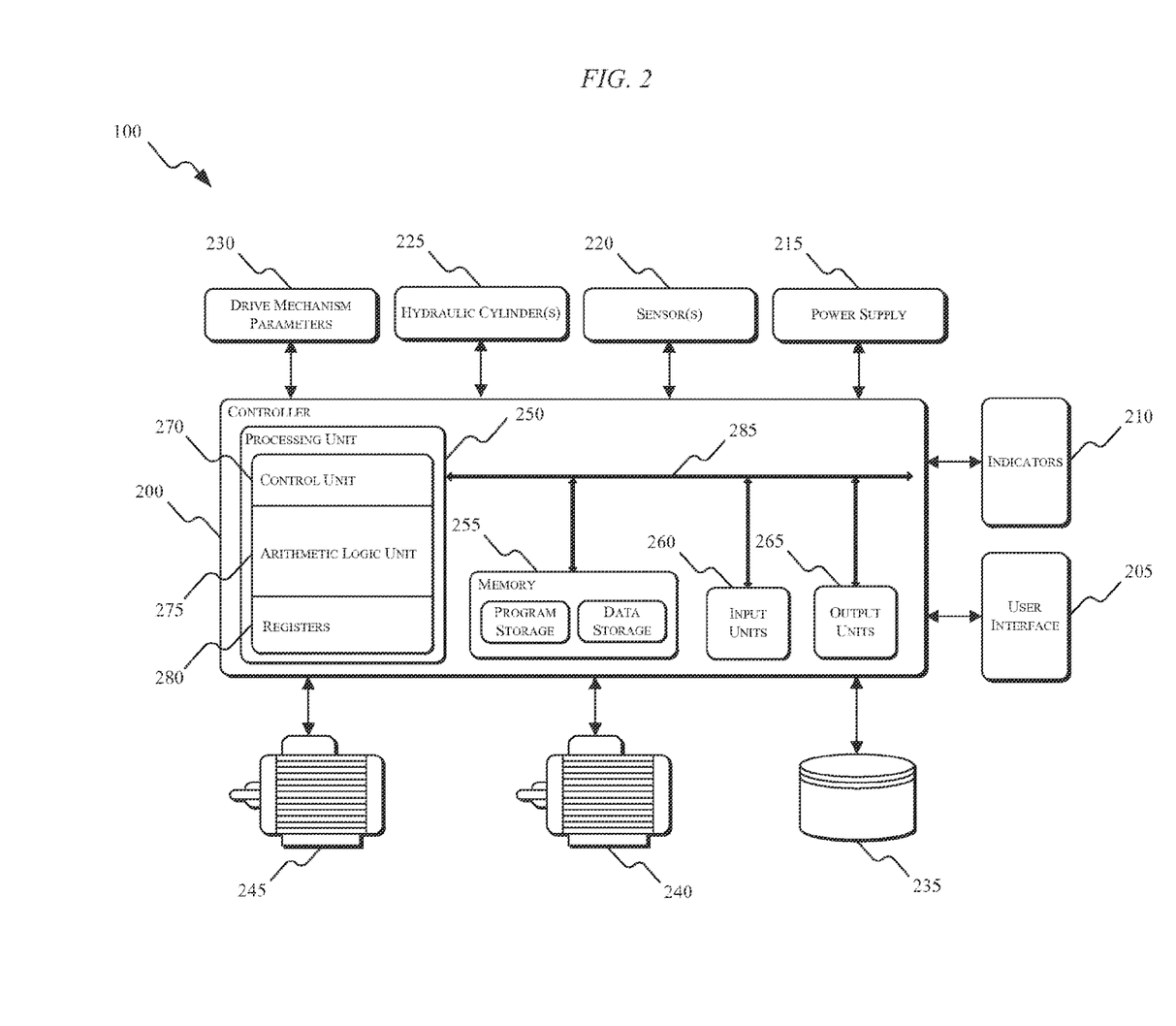
FIG. 2 illustrates a controller for a chain conveyor according to one embodiment of the invention.

FIG. 2 illustrates a controller 200 associated with the AFC 100. The controller 200 is connected or coupled to a variety of additional modules or components, such as a user interface module 205, one or more indicators 210, a power supply module 215, one or more sensors 220, one or more hydraulic cylinders 225, a drive mechanism or motor parameters module 230, a data store or database 235, a first drive mechanism and drive 240 (e.g., associated with the maingate), and a second drive mechanism and drive 245 (e.g., associated with the tailgate). In some embodiments, the first drive mechanism and drive 240 includes a first motor and a first motor drive, and the second drive mechanism and drive 245 includes a second motor and second motor drive. In some embodiments, a first motor and first motor drive 240 and the second motor and second motor drive 245 each include switchgear assemblies. Embodiments of the invention described herein are described with respect to the drive mechanisms and drives being motors and motor drives. The one or more sensors 220 are, for example, tachometers configured to measure or sense a characteristic of the first sprocket or the second sprocket (e.g., a socket rotational position, a sprocket rotational speed, a sprocket rotational acceleration, etc.), proximity sensors configured to measure or sense a characteristic of the chain (e.g., a chain position, a chain speed, a chain acceleration, etc.), power transducers within the AFC 100 configured to measure or sense an electrical characteristic (e.g., current, voltage, power factor, torque, speed, input power, output power, etc.), load cells, etc. The controller 200 includes combinations of hardware and software that are operable to, among other things, control the operation of the AFC 100, control the position of the one or more hydraulic cylinders 225, activate the one or more indicators 210 (e.g., a liquid crystal display ["LCD"]), monitor the operation of the AFC 100, etc.

In some embodiments, the controller 200 includes a plurality of electrical and electronic components that provide power, operational control, and protection to the components and modules within the controller 200 and/or the AFC 100. For example, the controller 200 includes, among other things, a processing unit 250 (e.g., a microprocessor, a microcontroller, or another suitable programmable device), a memory 255, input units 260, and output units 265. The processing unit 250 includes, among other things, a control unit 270, an arithmetic logic unit ("ALU") 275, and a plurality of registers 280 (shown as a group of registers in FIG. 2), and is implemented using a known computer architecture, such as a modified Harvard architecture, a von Neumann architecture, etc. The processing unit 250, the memory 255, the input units 260, and the output units 265, as well as the various modules connected to the controller 200 are connected by one or more control and/or data buses (e.g., common bus 285). The control and/or data buses are shown generally in FIG. 2 for illustrative purposes. The use of one or more control and/or data buses for the interconnection between and communication among the various modules and components would be known to a person skilled in the art in view of the invention described herein. In some embodiments, the controller 200 is implemented partially or entirely on a semiconductor chip, is a field-programmable gate array ("FPGA"), is an application specific integrated circuit ("ASIC"), etc.

The memory 255 includes, for example, a program storage area and a data storage area. The program storage area and the data storage area can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices or data structures. The processing unit 250 is connected to the memory 255 and executes software instructions that are capable of being stored in a RAM of the memory 255 (e.g., during execution), a ROM of the memory 255 (e.g., on a generally permanent basis), or another non-transitory computer readable medium such as another memory or a disc. Software included in the implementation of the AFC 100 can be stored in the memory 255 of the controller 200. The software includes, for example, firmware, one or more applications, program data, filters, rules, one or more program modules, and other executable instructions. The controller 200 is configured to retrieve from memory and execute, among other things, instructions related to the control processes and methods described herein. In other constructions, the controller 200 includes additional, fewer, or different components.

The drive mechanism or motor parameters module 230 is connected to or associated with the motors and drives 240, 245 that are coupled to the first sprocket and/or the second sprocket. The parameters module 230 is configured to receive signals associated with one or more parameters (e.g., current, voltage, power factor, torque, speed, input power, output power, etc.) of the motors 240, 245. In some embodiments, the parameters module 230 receives signals related to the motor parameters. In other embodiments, the parameters module 230 includes or is connected to the one or more sensors 220 for sensing the motor parameters.

The motors 240, 245 are controlled by control signals received from the controller 200 or another associated controller. The motors 240, 245 are also coupled to gear reduction boxes to reduce the rotational speed of the motors to a rotational speed appropriate for the sprockets and conveyor. In some implementations, the controller 200 is configured to control the motors 240, 245 and the AFC autonomously using the sensors 220 and one or more stored programs or modules. In other implementations, the controller 200 is configured to control the motors and the AFC based on a combination of manual inputs and automatic controls. The one or more hydraulic cylinders 225 also receive control signals from the controller 200, and selectively extend or retract the return end frame (e.g., change the position of the first sprocket, the second sprocket, etc.) based on the control signals from the controller 200. The controller 200 also monitors the motors and the one or more hydraulic cylinders 225 to determine related characteristics. For example, the controller 200 can monitor or sense electrical characteristics of the one or more motors, the position of the one or more hydraulic cylinders 225 (e.g., an extension of the one or more hydraulic cylinders), etc. Although a single controller is illustrated, in other constructions, the controller 200 may be separated into a plurality of controllers. For example, the controller 200 may be separated into a consolidated control unit ("CCU"), a programmable control unit ("PCU"), etc. The CCU can be housed in an explosion-proof enclosure and provides control over the conveyor system. The PCU is an intrinsically safe system that can be interfaced with the CCU for, among other things, stopping, inhibiting, tripping, etc., the operation of the conveyor.

The user interface module 205 is used to control or monitor the AFC or the mining system. For example, the user interface module 205 is operably coupled to the controller 200 to control the speed of the conveyor, the speed of the one or more motors, etc. The user interface module 205 can include a combination of digital and analog input or output devices required to achieve a desired level of control and monitoring for the AFC. For example, the user interface module 205 can include a display and input devices such as a touch-screen display, one or more knobs, dials, switches, buttons, etc. The display is, for example, a liquid crystal display ("LCD"), a light-emitting diode ("LED") display, an organic LED ("OLED") display, an electroluminescent display ("ELD"), a surface-conduction electron-emitter display ("SED"), a field emission display ("FED"), a thin-film transistor ("TFT") LCD, etc. In other constructions, the display is a Super active-matrix OLED ("AMOLED") display. The user interface module 205 can also be configured to display conditions or data associated with the AFC in real-time or substantially real-time. For example, the user interface module 205 is configured to display measured electrical characteristics of the AFC, the status of the AFC, chain tensions, fault conditions (e.g., slack chain, zero tension chain, etc.), an amount of mined material on the conveyor, etc. In some implementations, the user interface module 205 is controlled in conjunction with the one or more indicators 210 (e.g., LEDs) to provide visual indications of the status or conditions of the AFC.

As previously indicated, in some embodiments, the controller 200 is configured to reduce the amount of slack in the chain by using one or more characteristics associated with the AFC to automatically control the position of the one or more hydraulic cylinders. The controller 200 is also configured to receive signals from the one or more sensors 220 associated with the one or more motors, the one or more hydraulic cylinders 225, one or more chains, or other components of the AFC. The signals from the sensors 220 are related to, for example, a sprocket rotational position, a sprocket rotational speed, a sprocket rotational acceleration, a chain link count, a chain position, a chain speed, a chain acceleration, etc. The controller 200 then processes and analyzes the signals to determine the amount of slack in the chain.

In some embodiments, the controller 200 determines an amount of slack in the chain and controls the position of the hydraulic cylinder 225 based on a comparison of a characteristic of the first sprocket or the second sprocket of the AFC 100 (e.g., sprocket acceleration) and a characteristic of the chain of the AFC 100 (e.g., chain acceleration). In other embodiments, the controller 200 determines an amount of slack in the chain and controls the position of the hydraulic cylinder 225 based on a comparison of a number of chain links passing a first monitored position of the AFC 100 and a number of chain links passing a second monitored position of the AFC 100. Depending on the determined amount of slack in the chain, the one or more hydraulic cylinders 225 are controlled to increase or decrease the distance between the first sprocket and the second sprocket to account for the amount of slack in the chain. By automatically controlling the position of the hydraulic cylinder based on the determined amount of slack in the chain, the slack in the chain can be reduced or eliminated.

Figure 3A:
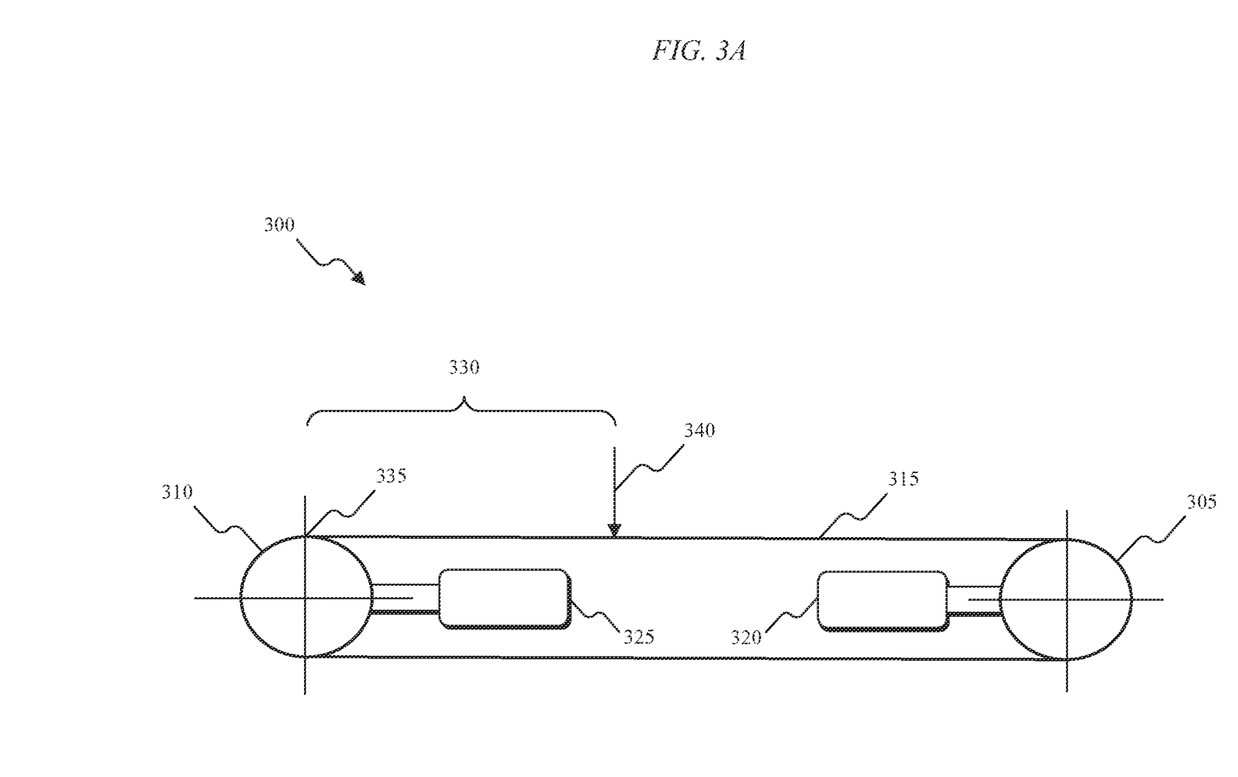
FIGS. 3A, 3B, and 3C are diagrams illustrating generalized conveyors and a "danger zone" of the conveyors.
Figure 3B:
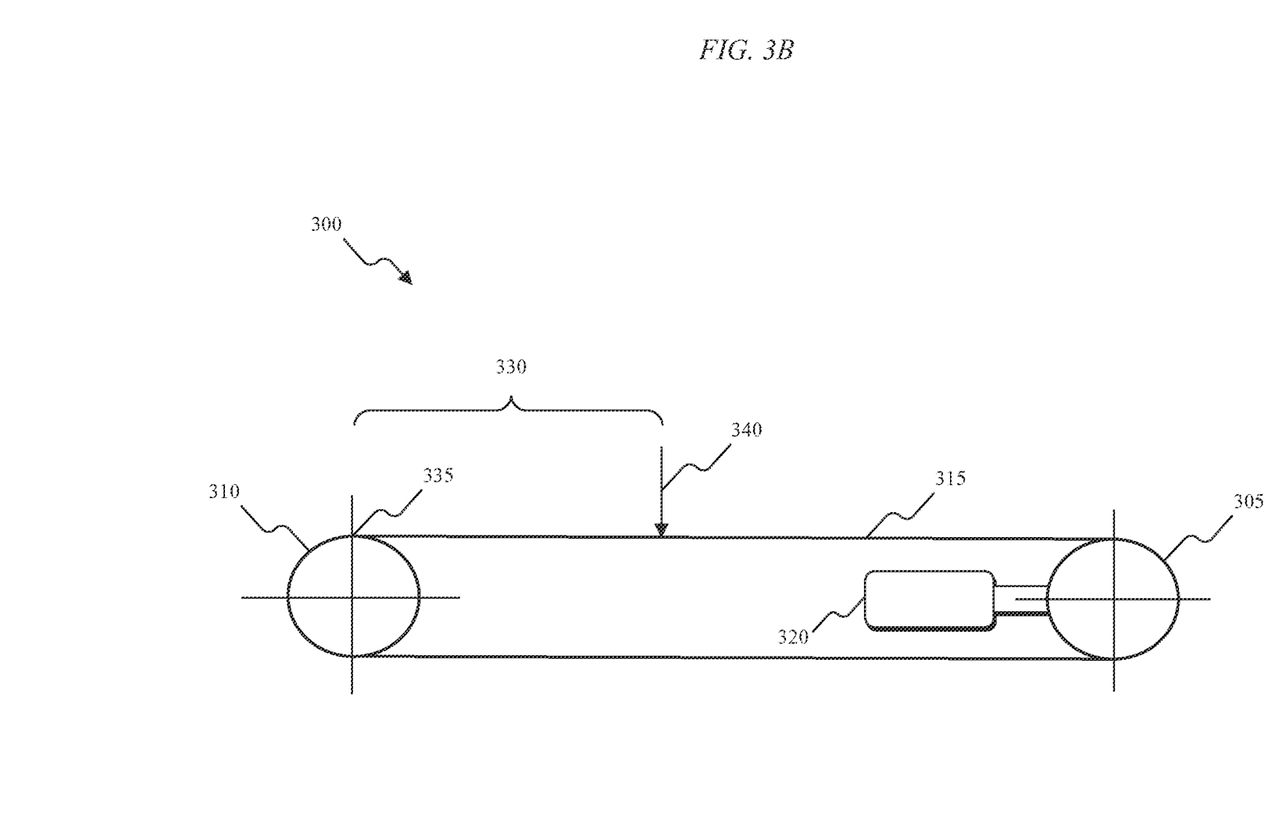
Figure 3C:
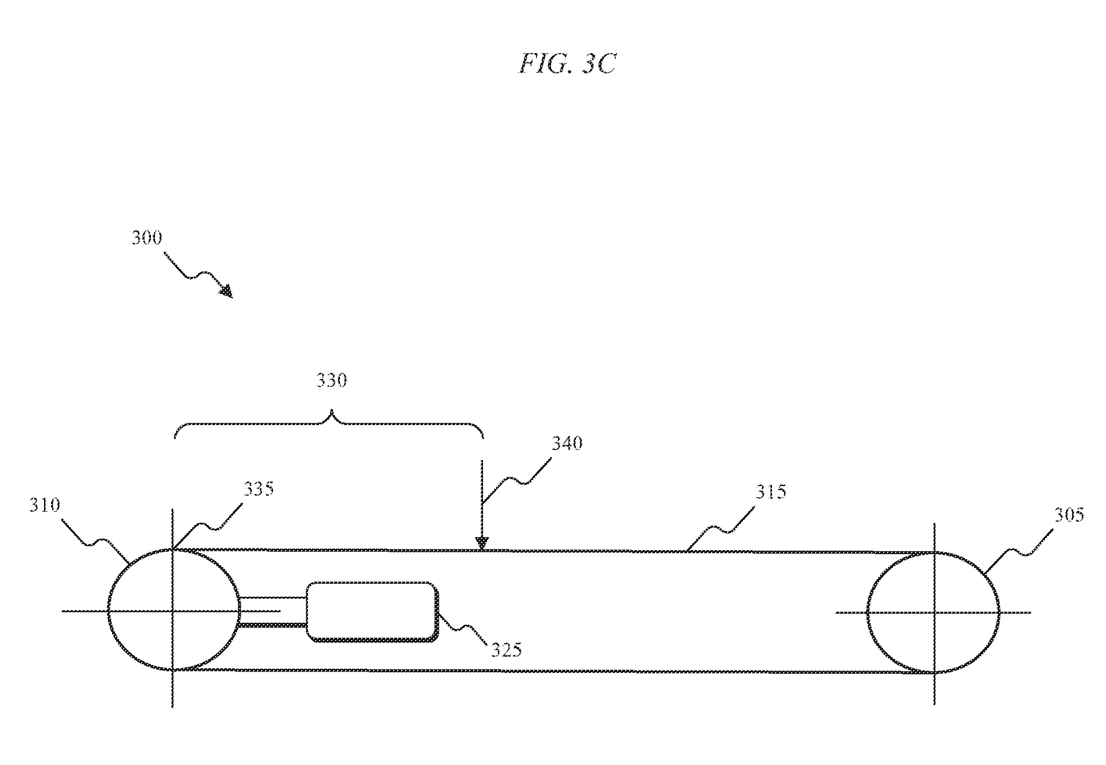

A generalized illustration of a conveyor 300 for a mining system is illustrated in FIG. 3A. The conveyor 300 includes a first sprocket or maingate sprocket 305, a second sprocket or tailgate sprocket 310, a chain 315, a first hydraulic cylinder 320, a second hydraulic cylinder 325, and a monitored zone or "danger zone" 330. The zone 330 is illustratively shown as an area between a top-dead-center ("TDC") point 335 of the second sprocket 310 and a loading point 340 (e.g., the point on the top portion of the chain where material is being loaded onto the conveyor). The zone 330 represents the portion of the chain 315 that is most likely to experience a slack chain (i.e., low-tension) condition. The amount of excess chain or slack in the chain 315 in the zone 330 can be determined and used to control the relative positions of the first sprocket 305 and the second sprocket 310. The relative positions of the sprockets can be modified by controlling the first hydraulic cylinder 320 and the second hydraulic cylinder 325. FIGS. 3B and 3C illustrate conveyors according to embodiments of the invention that include one hydraulic cylinder connected to either the first sprocket 305 or the second sprocket 310.

The relative distance between the first sprocket 305 and the second sprocket 310 can be modified or controlled based on a variety of conditions. For example, the position (i.e., cylinder position) of the first hydraulic cylinder 320 or second hydraulic cylinder 325 can be controlled based on a characteristic of the first sprocket 305 or the second sprocket 310 and a characteristic of the chain 315.

Specifically, the amount of excess chain or slack in the chain 315 is related to the difference between the characteristic of the first sprocket 305 or the second sprocket 310 and the characteristic of the chain 315. In some embodiments, the characteristic of the first sprocket 305 or the second sprocket 310 is a sprocket rotational position and the characteristic of the chain 315 is a chain position. The rotational position of the first sprocket 305 or the second sprocket 310 with respect to the first monitored position can be determined using a tachometer, and a rotational displacement of the sprocket can be determined. The tachometer provides a signal related to an angular distance through which the sprocket has rotated. The angular distance can be determined in radians, degrees, or can be converted to meters. The position of the chain can be determined using a proximity sensor or an infra-red sensing device to sense the movement of the chain at the second monitored location. For example, the proximity sensor can be used to directly count a number of chain links having a known size, a speed of the conveyor and a timer can be used to calculate or determine a displacement of the chain 315 with respect to the second monitored location, etc. The controller 200 then calculates or determines a difference between the sprocket rotational position and the chain position (i.e., determines a difference in the displacement of the chain with respect to both the first location and the second location). The difference in displacements represents a difference in the amount of chain that has entered the zone 330 and left the zone 330. The controller 200 then calculates or determines the amount of slack in the chain 315 by adding the result to previous measurements of the amount of slack in the chain 315 since the beginning of movement of the chain 315. The sum of the measurements of slack in the chain 315 in the zone 330 can be stored in and retrieved from the memory 255.

In other embodiments, the characteristic of the first sprocket 305 or the second sprocket 310 is a sprocket rotational speed and the characteristic of the chain 315 is a chain speed. As described above, a tachometer associated with the first sprocket 305 or the second sprocket 310 can be used to determine an angular distance through which the sprocket has rotated. A derivative of the angular distance (e.g., distance/time) corresponds to an angular speed of the sprocket 305, 310. The instantaneous speed of the chain 315 at the first monitored position can be calculated, if desired, based on a known radius of the sprocket 305, 310. The speed of the chain can be determined using a proximity sensor or an infra-red sensing device to sense the movement of the chain at the second monitored location. For example, the proximity sensor can be used to directly count a number of chain links having a known size and a timer can be used to calculate or determine a speed (e.g., distance/time) of the chain 315 with respect to the second monitored location. The controller 200 calculates or determines a difference between the sprocket rotational speed and the chain speed. The difference in speed represents a rate at which excess chain or slack in the chain 315 is being accumulated or removed from the zone 330. The controller 200 then calculates or determines the amount of slack in the chain 315 by multiplying the difference in speed by time (t) and adding the result to previous measurements of the amount of slack in the chain 315 since the beginning of movement of the chain 315. The sum of the measurements of slack in the chain 315 in the zone 330 can be stored in and retrieved from the memory 255.

In other embodiments, the characteristic of the first sprocket 305 or the second sprocket 310 is a sprocket rotational acceleration and the characteristic of the chain 315 is an acceleration of the chain 315. The rotational acceleration of the sprocket or an instantaneous acceleration of the sprocket at the first monitored location can be determined in a manner similar to that described above with respect to determining sprocket speed using a tachometer (e.g., take a derivative of speed). Similarly, the acceleration of the chain at the second monitored location can be determined using the proximity sensor or infra-red device. The controller 200 calculates or determines a difference between the sprocket rotational acceleration and the chain acceleration (e.g., a differential instantaneous acceleration). The difference in acceleration represents a rate at which excess chain or slack in the chain 315 is being accumulated or removed from the zone 330. The controller 200 then calculates or determines the amount of slack in the chain 315 by multiplying the difference in acceleration by time ($t^2$) and adding the result to the previous measurements of the amount of slack in the chain 315 since the beginning of movement of the chain 315. The sum of the measurements of slack in the chain 315 in the zone 330 can be stored in and retrieved from the memory 255.

Additionally or alternatively, the controller 200 is operable to calculate or determine a number of chain links passing the first monitored position and the second monitored position and compare the number of chain links passing the first monitored position and the second monitored position. For example, the controller 200 receives a signal related to the number of chain links passing the first monitored position from a first sensor and the second monitored position from a second sensor. In some embodiments, the controller 200 calculates or determines a number of chain links passing a first monitored position (e.g., TDC point 335) by, for example, multiplying a sprocket rotational speed by a monitoring time and then dividing the result by a length of an individual chain link (e.g., stored in memory 255). In other embodiments, the controller 200 calculates or determines the number of chain links passing the first monitored position by dividing a change in the sprocket rotational position (e.g., converted to meters) by the length of the individual chain link. The controller 200 calculates or determines a number of chain links passing a second monitored position (e.g., load point 340) by multiplying the chain speed by a monitoring time and then dividing the result by the length of the individual chain link. In other embodiments, the controller 200 calculates or determines the number of chain links passing the first monitored position by dividing a change or displacement in the position of the chain by the length of the individual chain link. The controller 200 calculates or determines the amount of slack in the chain 315 as the difference between the number of chain links passing the first monitored position and the number of chain links passing the second monitored position.

Figure 4:
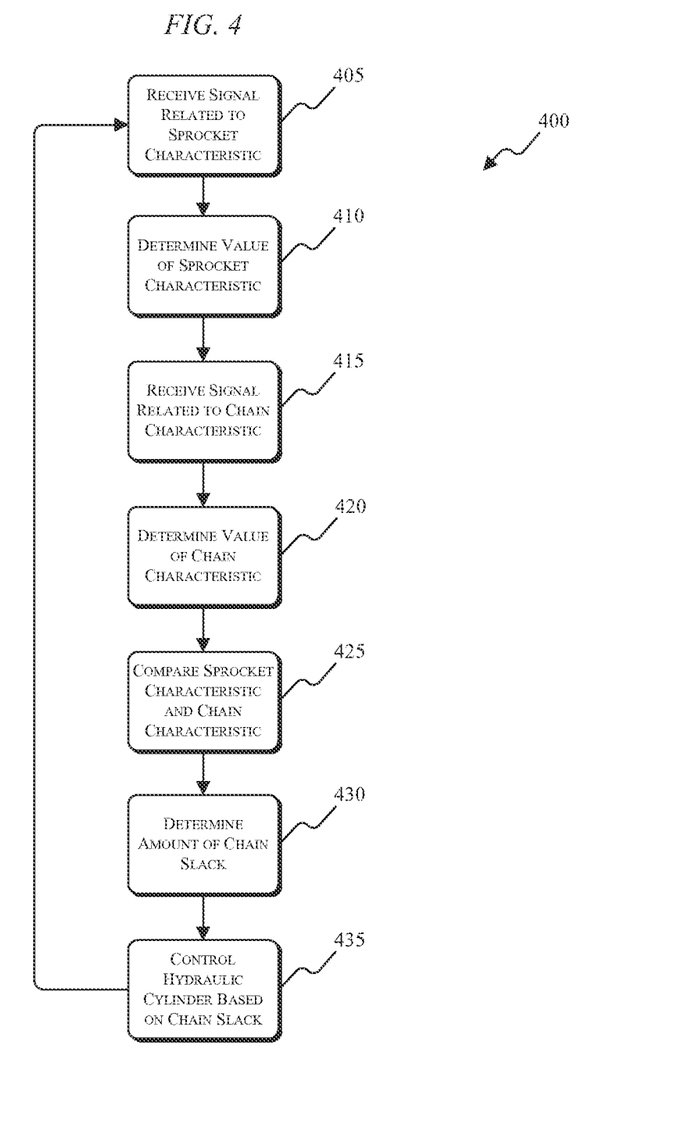
FIG. 4 is a process for determining an amount of slack in a chain for a conveyor.
Figure 5:
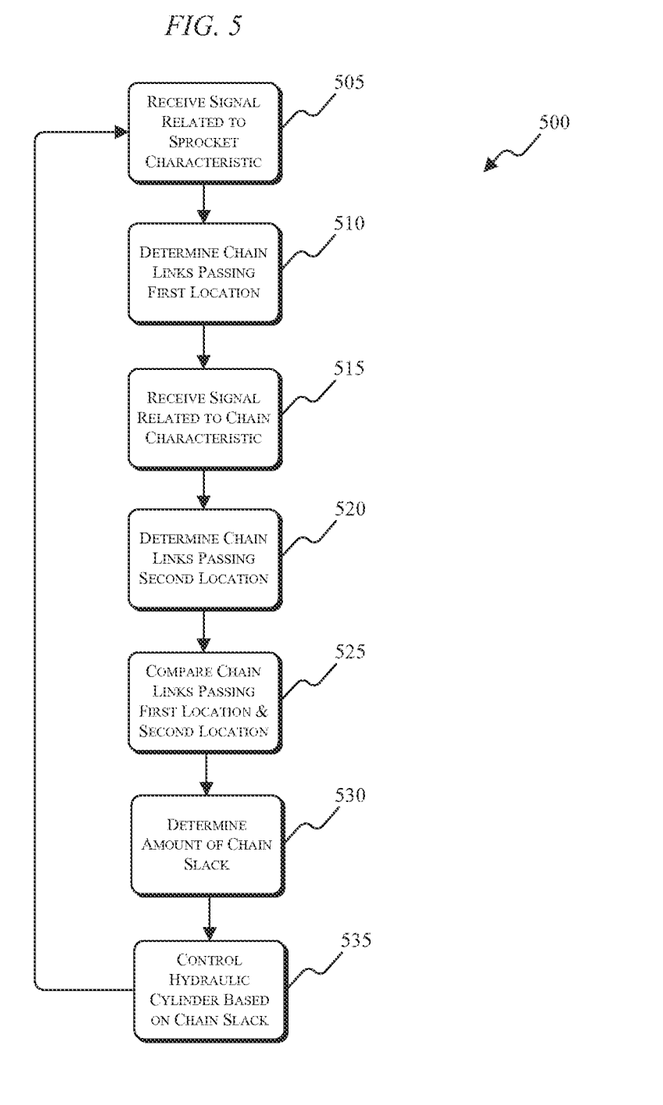
FIG. 5 is another process for determining an amount of slack in a chain for a conveyor.

The processes 400 and 500 are associated with and described herein with respect to determining an amount of slack in the chain of the conveyor of a mining system. Various steps described herein with respect to the processes 400 and 500 are capable of being executed simultaneously, in parallel, or in an order that differs from the illustrated serial manner of execution. The processes 400 and 500 may also be capable of being executed using fewer steps than are shown in the illustrated embodiment. Additionally, although the processes 400 and 500 are described separately, the controller 200 is operable to execute the processes 400 and 500 at the same time or in tandem with other processes. For example, in some embodiments, the controller 200 is configured to use both process 400 and 500 simultaneously to verify the determined amount of slack in the chain 315 to reduce the possibility of error due to faulty sensors 220.

FIG. 4 illustrates a process 400 for controlling the AFC. At step 405, a signal related to a characteristic of at least one of the first sprocket 305 or the second sprocket 310 is received by the controller 200 from a sensor associated with the sprocket. As described above, the sprocket characteristic is, for example, a sprocket rotational position, a sprocket rotational speed, a sprocket rotational acceleration, etc. The controller 200 then determines or calculates a value for the sprocket characteristic (step 410). The value for the sprocket characteristic can either be measured directly by a sensor 220 or determined indirectly based on a sensed characteristic (e.g., position, speed, etc.).

At step 415, a signal related to a characteristic of the chain is received by the controller 200 from a sensor associated with the chain 315. As described above, the chain characteristic is, for example, a chain position, a chain speed, a chain acceleration, etc. The controller 200 then determines or calculates a value for the chain characteristic (step 420). The value for the chain characteristic can either be measured directly by a sensor 220 or determined indirectly based on a sensed characteristic (e.g., position, speed, etc.).

A difference between the value of the sprocket characteristic and the chain characteristic can then be determined based on a comparison of the value of the sprocket characteristic and the value of the chain characteristic (step 425). For example, as described above, a difference in acceleration can be calculated as the difference between the sprocket rotational acceleration and the chain acceleration (known conversions from angular acceleration to linear acceleration can be applied as necessary). At step 430, the controller 200 determines or calculates an amount of excess or slack in the chain 315 within the zone 330 based on the comparison of step 425, as described above. Based on the amount of excess or slack in the chain 315, the controller 200 generates one or more control signals to control the hydraulic cylinder 320, 325 to a new position (step 435) to take up the slack in the chain.

FIG. 5 illustrates a process 500 for controlling the AFC. At step 505, a signal related to a characteristic of at least one of the first sprocket 305 or the second sprocket 310 is received by the controller 200 from a sensor associated with the sprocket. As described above, the sprocket characteristic is, for example, a sprocket rotational position, a sprocket rotational speed, a sprocket rotational acceleration, etc. The controller 200 then determines or calculates a number of chain links passing a first monitored location (step 510). The number of chain links passing the first monitored location can be determined or calculated based on a known chain link size and a rotational displacement of the sprocket with respect to the first monitored position. At step 515, a signal related to a characteristic of the chain is received by the controller 200 from a sensor associated with the chain 315. The controller 200 then determines or calculates a value for the chain characteristic (step 420).

As described above, the position of the chain can be determined using a proximity sensor or an infra-red sensing device to sense the movement of the chain at the second monitored location. For example, the beginning and the end of a chain link having a known size can be detected using the proximity sensor and the controller 200 can directly count the number of chain links passing to the second monitored location. A difference between the number of chain links passing the first monitored location and the number of chain links passing the second monitored position can then be determined based on a comparison of the number of chain links passing the first monitored location and the number of chain links passing the second monitored position (step 525). At step 530, the controller 200 determines or calculates an amount of excess or slack in the chain 315 within the zone 330 based on the comparison of step 525. Based on the amount of excess or slack in the chain 315, the controller 200 generates one or more control signals to control the hydraulic cylinder 320, 325 to a new position (step 535) to take up the slack in the chain.

Thus, the invention may generally provide, among other things, systems and methods for determining an amount of slack in a chain of a conveyor and correspondingly controlling a relative distance between a first sprocket and a second sprocket.

What is claimed is:
1. A conveyor for a mining system, the conveyor comprising:
a first sprocket and a second sprocket;
a chain associated with the first sprocket and the second sprocket;
a drive mechanism coupled to the first sprocket or the second sprocket, the drive mechanism operable to drive the first sprocket or the second sprocket;
a first sensor operable to generate a first signal related to a characteristic of the first sprocket or the second sprocket;
a second sensor operable to generate a second signal related to a characteristic of the chain; and
a controller operable to
receive the first signal from the first sensor, determine a value for the characteristic of the first sprocket or the second sprocket based on the first signal, receive the second signal from the second sensor, determine a value for the characteristic of the chain based on the second signal, compare the value for the characteristic of the first sprocket or the second sprocket and the value for the characteristic of the chain, and determine an amount of slack in the chain based on the comparison, wherein the characteristic of the chain includes a chain position, a chain speed, or a chain acceleration.

2. The conveyor of claim 1, wherein the characteristic of the first sprocket or the second sprocket includes a sprocket rotational position, a sprocket rotational speed, or a sprocket rotational acceleration.

3. The conveyor of claim 2, wherein the first sensor is a tachometer.

4. The conveyor of claim 1, wherein the second sensor is a proximity sensor.

5. The conveyor of claim 1, wherein the drive mechanism includes a motor.

6. The conveyor of claim 1, further comprising a hydraulic cylinder operable for controlling a distance between the first sprocket and the second sprocket, the hydraulic cylinder having a hydraulic cylinder position.

7. The conveyor of claim 6, wherein the controller is further operable to modify the hydraulic cylinder position based on the amount of slack in the chain to control the distance between the first sprocket and the second sprocket.

8. A method of determining an amount of slack in a chain of a conveyor in a mining system, the method comprising:

receiving, at a processor, a first signal associated with a characteristic of a first sprocket or a second sprocket;

determining, using the processor, a value for the characteristic of the first sprocket or the second sprocket based on the first signal;

receiving, at the processor, a second signal associated with a characteristic of a chain;

determining, using the processor, a value for the characteristic of the chain based on the second signal;

comparing, using the processor, the value for the characteristic of the first sprocket or the second sprocket and the value for the characteristic of the chain; and determining, using the processor, the amount of slack in the chain based on the comparison, wherein the second signal is related to a chain position, a chain speed, or a chain acceleration.

9. The method of claim 8, wherein the first signal is related to a sprocket rotational position, a sprocket rotational speed, or a sprocket rotational acceleration.

10. The method of claim 9, wherein the first signal is generated by a tachometer associated with the first sprocket or the second sprocket.

11. The method of claim 8, wherein the second signal is generated by a proximity sensor.

12. The method of claim 8, further comprising adjusting a hydraulic cylinder position based on the amount of slack in the chain to control a distance between the first sprocket and the second sprocket.

13. A conveyor for a mining system, the conveyor comprising:

a first sprocket and a second sprocket;

a monitored zone having a first monitored position and a second monitored position;

a chain associated with the first sprocket and the second sprocket;

a drive mechanism coupled to the first sprocket or the second sprocket, the drive mechanism operable to drive the first sprocket or the second sprocket;

a first sensor operable to generate a first signal related to a number of chain links passing the first monitored position of the monitored zone;

a second sensor operable to generate a second signal related to a number of chain links passing the second monitored position of the monitored zone; and a controller operable to receive the first signal from the first sensor, determine the number of chain links passing the first monitored position based on the first signal, receive the second signal from the second sensor, determine the number of chain links passing the second monitored position based on the second signal, compare the number of chain links passing the first monitored position and the number of chain links passing the second monitored position, and determine an amount of slack in the chain based on the comparison.

14. The conveyor of claim 13, wherein the first signal is related to a sprocket rotational position, a sprocket rotational speed, or a sprocket rotational acceleration.

15. The conveyor of claim 14, wherein the first sensor is a tachometer.

16. The conveyor of claim 13, wherein the second sensor is a proximity sensor.

17. The conveyor of claim 13, wherein the drive mechanism includes a motor.

18. The conveyor of claim 13, further comprising a hydraulic cylinder operable for controlling a distance between the first sprocket and the second sprocket, the hydraulic cylinder having a hydraulic cylinder position.

19. The conveyor of claim 18, wherein the controller is further operable to modify the hydraulic cylinder position based on the amount of slack in the chain to control the distance between the first sprocket and the second sprocket.

20. A method of determining an amount of slack in a chain of a conveyor in a mining system, the method comprising:

receiving, at a processor, a first signal related to a number of chain links passing a first monitored position of a monitored zone;

determining, using the processor, the number of chain links passing the first monitored position based on the first signal;

receiving, at the processor, a second signal related to a number of chain links passing the second monitored position of the monitored zone;

determining, using the processor, the number of chain links passing the second monitored position based on the second signal;

comparing, using the processor, the number of chain links passing the first monitored position and the number of chain links passing the second monitored position; and determining, using the processor, the amount of slack in the chain based on the comparison.

21. The method of claim 20, wherein the first signal is related to a sprocket rotational position, a sprocket rotational speed, or a sprocket rotational acceleration.

22. The method of claim 21, wherein the first signal is generated by a tachometer associated with the first sprocket or the second sprocket.

23. The method of claim 20, wherein the second signal is generated by a proximity sensor.

24. The method of claim 20, further comprising adjusting a hydraulic cylinder position based on the amount of slack in the chain to control a distance between the first sprocket and the second sprocket.

\* \* \* \* \*